United States Patent
Hunter et al.

(10) Patent No.: US 10,203,037 B2
(45) Date of Patent: Feb. 12, 2019

(54) EXTREME SERVICE PLUG VALVE

(71) Applicant: GE Oil & Gas Pressure Control LP, Houston, TX (US)

(72) Inventors: Rick C. Hunter, Houston, TX (US); Robert S. McKee, Houston, TX (US); Manuel Garibay, Houston, TX (US); Chad Eric Yates, Houston, TX (US)

(73) Assignee: GE Oil & Gas Pressure Control LP, Houston, TX (US)

( * ) Notice: Subject to any disclaimer, the term of this patent is extended or adjusted under 35 U.S.C. 154(b) by 375 days.

(21) Appl. No.: 14/992,744

(22) Filed: Jan. 11, 2016

(65) Prior Publication Data
US 2016/0201811 A1 Jul. 14, 2016

Related U.S. Application Data

(60) Provisional application No. 62/102,455, filed on Jan. 12, 2015.

(51) Int. Cl.
*E21B 34/02* (2006.01)
*F16K 5/04* (2006.01)
*E21B 1/00* (2006.01)

(52) U.S. Cl.
CPC .............. *F16K 5/0471* (2013.01); *E21B 1/00* (2013.01)

(58) Field of Classification Search
CPC .................................. F16K 5/0471; E21B 1/00
See application file for complete search history.

(56) References Cited

U.S. PATENT DOCUMENTS

| | | | | |
|---|---|---|---|---|
| 2,488,932 A | * | 11/1949 | Penick | F16K 5/185 137/246.22 |
| 2,591,031 A | * | 4/1952 | Volpin | F16K 5/225 137/246.11 |
| 2,647,720 A | * | 8/1953 | Volpin | F16K 5/225 137/246.14 |

(Continued)

FOREIGN PATENT DOCUMENTS

| | | |
|---|---|---|
| CA | 2476813 A1 | 2/2006 |
| CN | 104763375 A | 7/2015 |

(Continued)

OTHER PUBLICATIONS

A PCT Search Report and Written Opinion issued in connection with corresponding PCT Application No. PCT/US2016/012960 dated Apr. 28, 2016.

*Primary Examiner* — Benjamin F Fiorello
(74) *Attorney, Agent, or Firm* — Hogan Lovells US LLP

(57) ABSTRACT

A valve assembly for managing a flow of fluids in hydrocarbon development and production operations includes a valve body having an internal body cavity and a body bore intersecting the body cavity. A valve plug is located within the body cavity and is rotatable between an open position and a closed position. A sleeve is located between the valve plug and the valve body and is rotationally fixed to the valve body and remains rotationally static relative to the valve body as the valve plug rotates. A seal groove is located on a sidewall surface of the sleeve and circumscribes one of the sleeve openings. A seal assembly has a seal ring that is U shaped in cross section with an inner leg that engages the seal groove and an outer leg that extends out of the seal groove and engages one of the valve body and the valve plug.

40 Claims, 9 Drawing Sheets

(56) References Cited

U.S. PATENT DOCUMENTS

| | | | |
|---|---|---|---|
| 2,997,057 A | 8/1961 | Toth | |
| 4,815,700 A | 3/1989 | Mohrfeld | |
| 5,676,348 A | 10/1997 | Ungchusri | |
| 6,231,027 B1 | 5/2001 | Baker | |
| 6,345,805 B1 | 2/2002 | Chatufale | |
| 6,378,841 B1 | 4/2002 | Russell | |
| 6,554,249 B2 | 4/2003 | Pang | |
| 6,585,227 B2 | 7/2003 | Newport et al. | |
| 6,655,658 B2 | 12/2003 | Neal | |
| 6,675,825 B1 | 1/2004 | Reeves et al. | |
| 6,918,574 B2 | 7/2005 | Hallden et al. | |
| 7,204,474 B2 | 4/2007 | McGuire | |
| 7,275,591 B2 | 10/2007 | Allen et al. | |
| 7,451,959 B2 | 11/2008 | Matzner | |
| 8,490,652 B2 | 7/2013 | Bohaychuk et al. | |
| 8,490,950 B2 | 7/2013 | Hunter | |
| 2004/0144566 A1* | 7/2004 | Fisher | E21B 1/00 175/55 |
| 2008/0092966 A1 | 4/2008 | Keiser | |
| 2008/0182114 A1 | 7/2008 | Kim et al. | |
| 2011/0037008 A1 | 2/2011 | Anderson | |
| 2014/0048734 A1 | 2/2014 | Witkowski et al. | |

FOREIGN PATENT DOCUMENTS

| | | |
|---|---|---|
| GB | 635891 A | 4/1950 |
| GB | 2515055 A | 12/2014 |
| WO | 2015094156 A1 | 6/2015 |

\* cited by examiner

EXTREME SERVICE PLUG VALVE

CROSS REFERENCE TO RELATED APPLICATION

This application claims priority to and the benefit of U.S. Provisional Application Ser. No. 62/102,455, titled "Extreme Service Plug Valve," filed Jan. 12, 2015, the full disclosure of which is hereby incorporated herein by reference in its entirety for all purposes.

BACKGROUND OF THE DISCLOSURE

1. Field of the Disclosure

This disclosure relates in general to valves for hydrocarbon drilling, production and processing operations, and in particular to plug valves used for managing fluids associated with hydrocarbon drilling, production and processing operations.

2. Description of Related Art

Gate valves and ball valves can be used to manage fluids relating to hydrocarbon drilling, production and processing operations. However gate valves have cavities or voids which create pockets for sand and debris accumulation, and ball valves generally have open spaces around the ball. During operations of gate valves and ball valves, solid matter can accumulate in such voids and open spaces, which degrades their ability to seal or operate and eventually leads to failure.

It can be difficult to manufacture advanced rigid high pressure seals and some common valves instead currently use primarily elastomeric seals due to their conformability. However elastomeric seals alone can be both pressure and temperature limited and will result in plug valve assemblies that are not usually used in high pressure applications, in particular due to the extrusion of the elastomeric seals during operation.

It is also difficult to achieve metal to metal sealing around complex geometric shapes, such as a ball or cylinder. This is because the manufacturing of these parts to achieve conforming surfaces is more difficult, than say for flat gates and seats. As a result these valves are generally not used in bi-directional applications, or do not perform well at low pressures.

Furthermore, it is difficult to prevent sand or debris from entering the dynamic sealing areas for all types of valves. The ingress of sand or debris may prevent the valve from sealing properly. Therefore it is beneficial to permit only very small or zero clearances around the sealing surfaces.

SUMMARY OF THE DISCLOSURE

Embodiments described herein provide systems and methods for a plug valve assembly that can provide open and close operation in about half of the space and weight of a current gate valve. In addition, valve assemblies of embodiments of this disclosure do not have any large void areas where solid matter can accumulate, nor permit sand to be entrained in the sealing areas.

Embodiments of this disclosure also provide a valve assembly that can be used in bi-directional high pressure applications without being prone to leakage. Furthermore systems and methods described herein reduce the torque required to operate the valve assembly.

In an embodiment of this disclosure, a valve assembly for managing the flow of fluids in hydrocarbon drilling, production and processing operations includes a valve body having an internal body cavity and a body bore extending through the valve body and intersecting the body cavity. A valve plug is located within the body cavity. The valve plug has a through bore and is rotatable between an open position where the plug through bore registers with the body bore and a closed position where the valve plug prevents the flow of a fluid through the body bore. A sleeve is located between the valve plug and the valve body, the sleeve also having a cross bore with a pair of sleeve openings through a sidewall that align with the body bore. The sleeve is rotationally fixed to the valve body so that the sleeve remains rotationally static relative to the valve body as the valve plug rotates within the sleeve between the open position and the closed position. A seal groove is located on a sidewall surface of the sleeve, the seal groove circumscribing one of the sleeve openings. A seal assembly is located within the seal groove, the seal assembly having a seal ring being U shaped in cross section with an inner leg that engages the seal groove and an outer leg that extends out of the seal groove and engages one of the valve body and the valve plug.

In an alternate embodiment of this disclosure, a method of forming a valve assembly for managing a flow of fluids in hydrocarbon development and production operations includes providing a valve body having an internal body cavity and a body bore extending through the body and intersecting the body cavity. A sleeve having a central bore and a pair of sleeve openings through the sidewall of the sleeve is provided. A pair of seal grooves are formed on a sidewall surface of a sleeve, each of the seal grooves circumscribing one of the sleeve openings. A seal assembly is located within the seal groove, the seal assembly having a seal ring that is U shaped in cross section. A valve plug is located within the sleeve, the valve plug having a plug through bore. The sleeve is located within the valve body so that the pair of sleeve openings align with the body bore, and so that an inner leg of the seal ring engages the seal groove and an outer leg of the seal ring extends out of the seal groove and engages one of the valve body and the valve plug, and so that the valve plug is rotatable between an open position where the plug through bore registers with the body bore and a closed position where the valve plug prevents the flow of a fluid through the body bore, the sleeve remaining rotationally static relative to the valve body as the valve plug rotates within the sleeve between the open position and the closed position.

In another alternate embodiment of this disclosure, a method of managing a flow of fluids in hydrocarbon development and production operations with a valve assembly includes providing a valve body having an internal body cavity and a body bore extending through the body and intersecting the body cavity. A valve plug is provided within the valve body, the valve plug having a plug through bore. A sleeve is rotationally fixed in the valve body between the valve body and the plug, the sleeve having a central bore, a pair of sleeve openings through the sidewall of the sleeve, and a seal assembly located within each of a pair a seal grooves on a sidewall surface of a sleeve, each the of the seal grooves circumscribing one of the sleeve openings. The seal assembly has a seal ring that is U shaped in cross section with an inner leg of the seal ring engaging the seal groove and an outer leg of the seal ring extending out of the seal groove and forming a seal with one of the valve body and the valve plug. The valve plug is rotated between an open position where the plug through bore registers with the body bore, and a closed position where the valve plug prevents the flow of a fluid through the body bore.

BRIEF DESCRIPTION OF THE DRAWINGS

So that the manner in which the features, advantages and objects of the disclosure, as well as others which will become apparent, are attained and can be understood in more detail, more particular description of embodiments of the disclosure briefly summarized above may be had by reference to the embodiment thereof which is illustrated in the appended drawings, which drawings form a part of this specification. It is to be noted, however, that the drawings illustrate only certain embodiments of the disclosure and is therefore not to be considered limiting of its scope as the disclosure may admit to other equally effective embodiments.

DETAILED DESCRIPTION OF THE DISCLOSURE

The system and method of the present disclosure will now be described more fully hereinafter with reference to the accompanying drawings which illustrate embodiments of the disclosure. The system and method of this disclosure may, however, be embodied in many different forms and should not be construed as limited to the illustrated embodiments set forth herein. Rather, these embodiments are provided so that this disclosure will be thorough and complete, and will fully convey the scope of the disclosure to those skilled in the art. Like numbers refer to like elements throughout, and the prime notation, if used, indicates similar elements in alternative embodiments.

Figure 1:
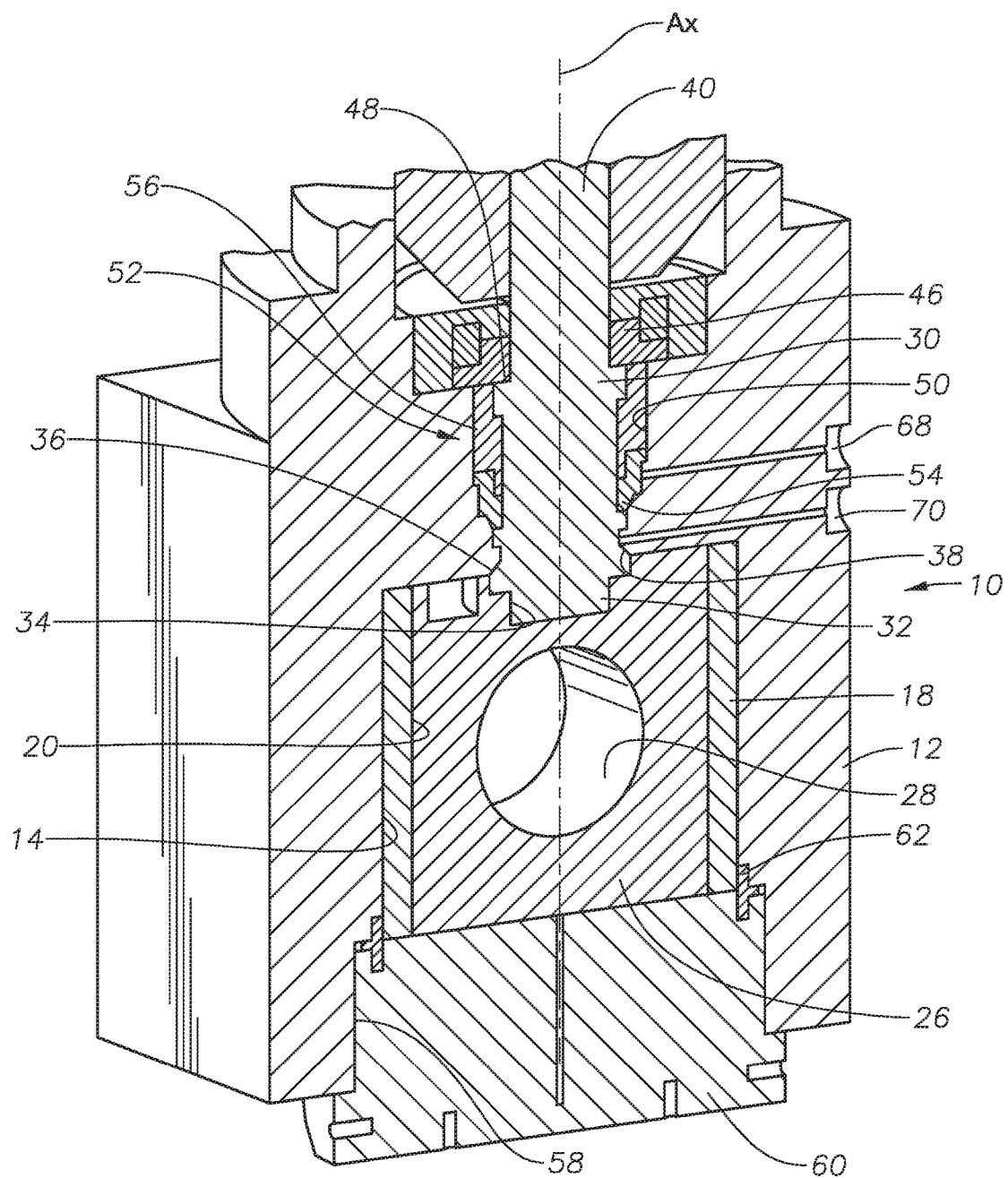
FIG. 1 is a perspective section view of a valve assembly in accordance with an embodiment of this disclosure, shown along a plane perpendicular to the body bore and with the valve plug in the open position.

Looking at FIG. 1, valve assembly 10 includes valve body 12. Valve body 12 has internal body cavity 14. Internal body cavity 14 is an open space within valve body 12 that can be centered around axis Ax. Valve body 12 also has body bore 16 (FIG. 2) extending through valve body 12 along axis Ay and intersecting body cavity 14. Valve body 12 can have any number of different outlet connections depending on the application. As an example the outlet connection can be a hammer union style connection, an API studded connection, or a flanged connection. Valve body 12 can be made of low alloy steels and may be cladded with a corrosion resistant coating such as a nickel alloy or a polymer around the sealing surfaces.

Valve assembly 10 can be associated with a wellhead assembly that is disposed over a well (not shown). The wellhead assembly can include a wellhead housing, a production tree over the housing and flow lines connected to the tree or the wellhead assembly. The flow lines and wellhead assembly can include embodiments of valve assembly 10 described herein. Valve assembly 10 can also be used for regulating fluids that communicate with the wellhead assembly, or for regulating well and other fluids that are otherwise travelling along a pipeline. As an example, valve assembly 10 can be used as part of high pressure hydraulic fracturing operations.

Valve assembly 10 can also include sleeve 18. Sleeve 18 is located within body cavity 14 of valve body 12. Sleeve 18 has central bore 20 and a cross bore that is generally orthogonal to central bore 20. The cross bore includes a pair of sleeve openings 22 (FIG. 2) through a sidewall of sleeve 18 that align with body bore 16. Sleeve 18 is rotationally fixed to valve body 12 so that sleeve 18 remains rotationally static relative to valve body 12 so that sleeve openings 22 remain aligned with and register with body bore 16. As an example, looking at FIG. 2, sleeve pins 24 can extend between valve body 12 and sleeve 18 and rotationally fix sleeve 18 to valve body 12.

Sleeve 18 can be a generally cylindrical shaped member. However, as discussed further herein, sleeve 18 may not be cylindrical about central axis Ax and may instead for example, have a constant outer diameter and a varying inner diameter. Alternately, sleeve 18 can have multiple outer diameters. As an example, sleeve 18 can have a tapered outer surface and a cylindrical inner surface. Sleeve 18 can be a one piece design or can alternately be a split member and formed of two or more portions that allow some relative float to establish a uniform fit when differential pressure is applied to valve assembly 10.

Looking at FIG. 1, valve assembly 10 can further include valve plug 26. Valve plug 26 is located within central bore 20 of sleeve 18 so that sleeve 18 is located between valve plug 26 and valve body 12. Valve plug 26 has a cylindrical shape with plug through bore 28 that extends through valve plug 26 along the axis Ay that is generally perpendicular to central axis Ax. Valve plug 26 is rotatable between an open position where plug through bore 28 registers with body bore 16, and a closed position where valve plug 26 prevents the flow of a fluid through body bore 16. Looking at FIG. 2, when valve plug 26 is in the fully open position, plug through bore 28 is aligned with axis Ay. Looking at FIG. 4, when valve plug 26 is in the fully closed position, plug through bore 28 is aligned with axis Az. Sleeve 18 remains rotationally static relative to valve body 12 as valve plug 26 rotates within sleeve 18 between the open position and the closed position.

To fully close valve assembly 10, valve plug 26 is rotated such that the plug through bore 28 is 90 degrees out of rotation relative to body bore 16 and sleeve openings 22. Likewise, to fully open valve assembly 10, valve plug 26 is rotated 90 degrees so that plug through bore 28 aligns with body bore 16 and sleeve openings 22. Hence by a rotation of 90 degrees of valve plug 26, valve assembly 10 can go from fully open to fully closed, or vice versa. Valve assembly 10 can be bi-directional so that it can be used to manage a fluid flow in either direction through valve body 12. Therefore, when valve plug 26 is in the closed position, valve plug 26 is operable to block a pressurized fluid flowing in a first direction through body bore 16 of valve body 12 and to block a pressurized fluid flowing in a second direction through body bore 16 of valve body 12.

In order to rotate valve plug 26, valve stem 30 can be used. Valve stem 30 extends from valve plug 26 axially through valve body 12. Valve stem 30 is a separate part from valve plug 26. This allows valve plug 26 to float toward a downstream side of valve body 12 when valve plug 26 is in the closed position, to provide a higher rated seal between valve plug 26 and sleeve 18, and between sleeve 18 and valve body 12. Sleeve 18, valve plug 26, an valve stem 30 can be made from a variety of materials that meet the needs of the nature of the fluids passing through valve assembly 10. As an example, materials that form sleeve 18, valve plug 26, and valve stem 30 can include low alloy steels, stainless steels, and highly corrosion resistant alloys. Sleeve 18, valve plug 26, and valve stem 30 can alternately be made of low cost steel and coated with a corrosion resistant coating such as tantalum or tungsten carbide, as is discussed further herein.

Valve stem 30 can have shaped end 32 that is in engagement with stem profile 34 of valve plug 26 so that valve stem 30 is axially unrestrained by valve plug 26. The interaction of shaped end 32 and stem profile 34 can be capable of transferring very high torques between valve stem 30 and valve plug 26 and yet allow for floating of valve plug 26 along axis Ax. This also allows valve plug 26 to float downstream to better engage the downstream seal.

Figure 2:
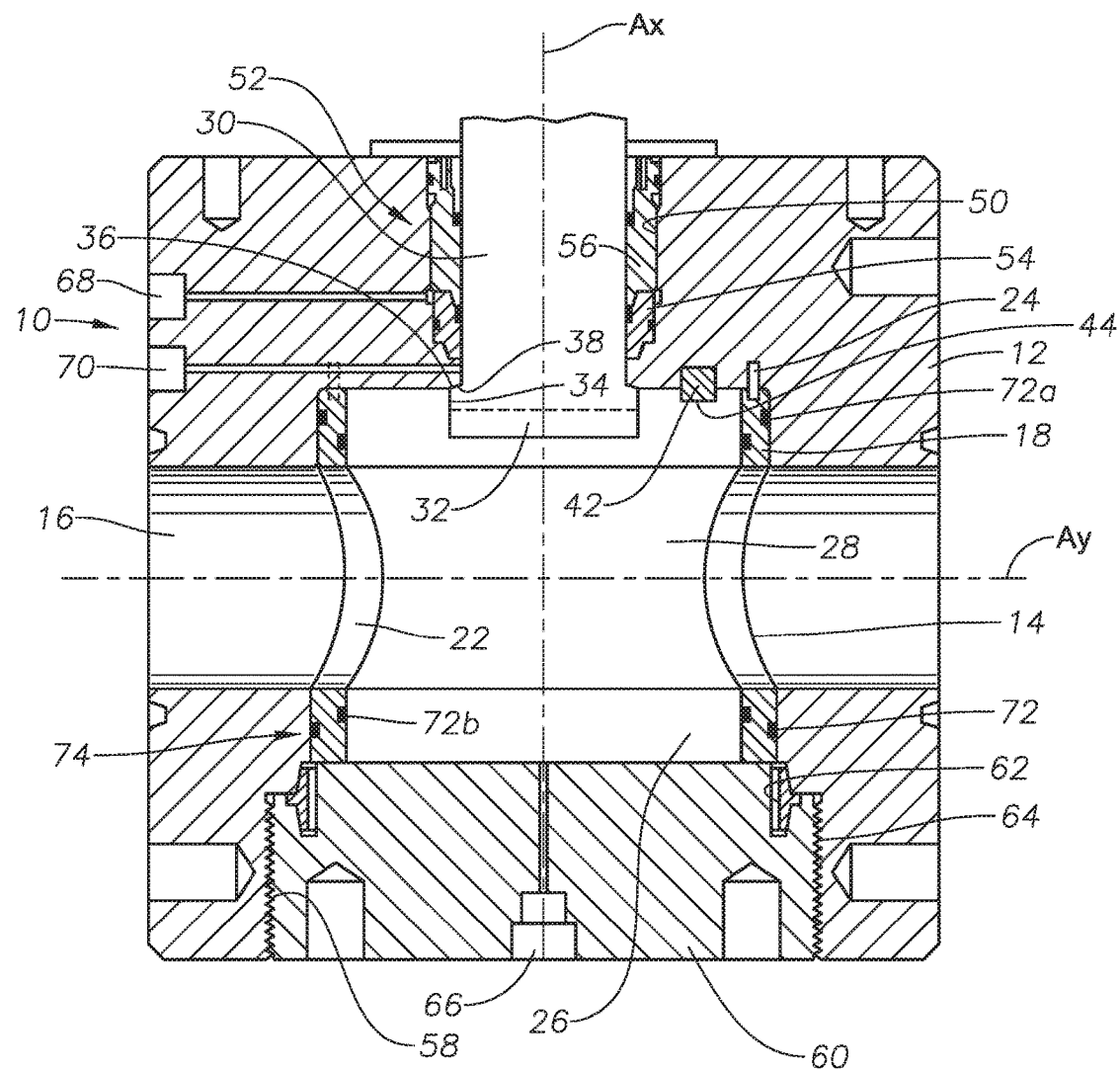
FIG. 2 is a section view of a valve assembly in accordance with an embodiment of this disclosure, shown along a plane along the body bore and with the valve plug in the open position.
Figure 3:
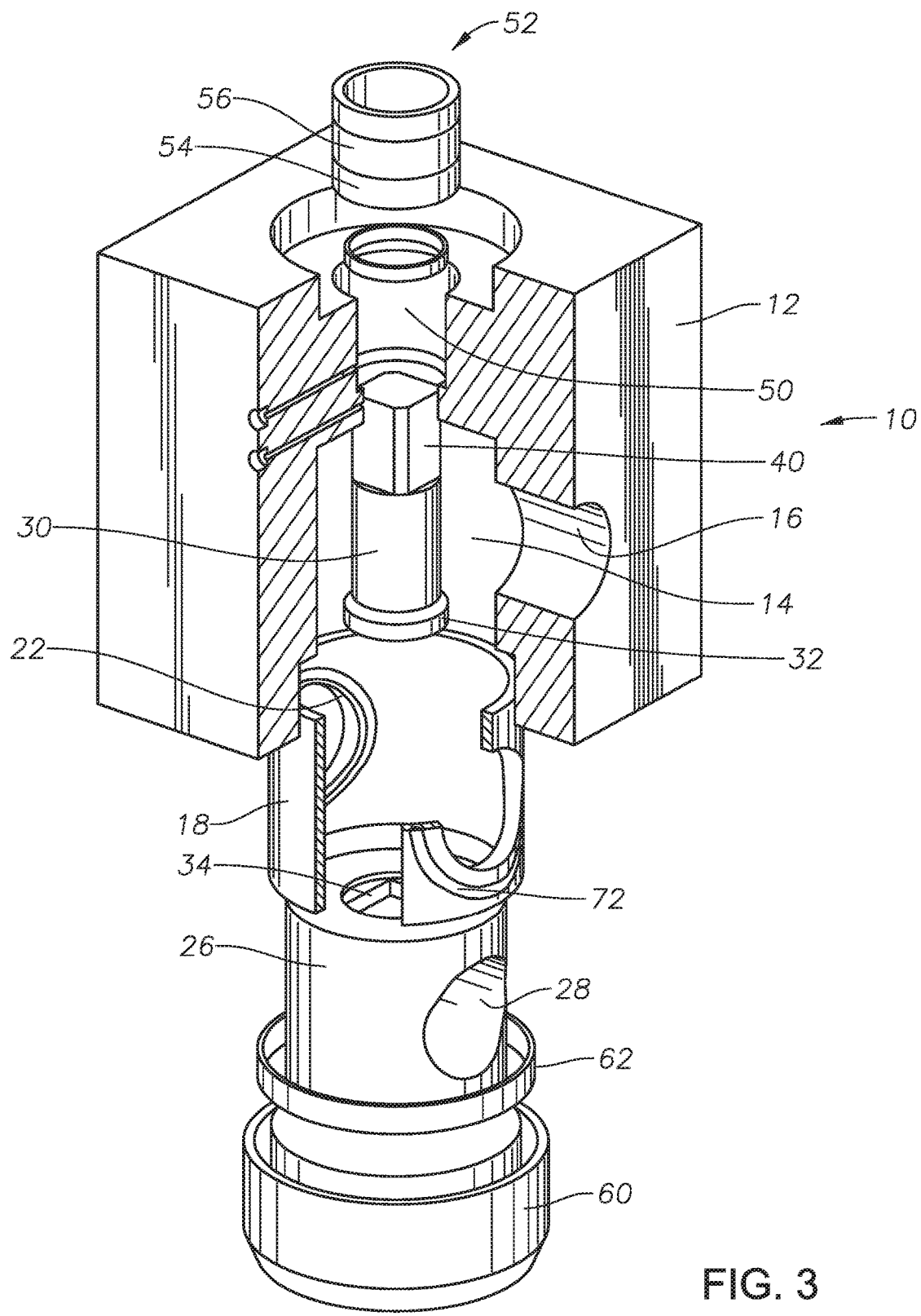
FIG. 3 is a perspective partial section exploded view of a valve assembly in accordance with an embodiment of this disclosure.

In order to prevent valve stem 30 from being pushed out of valve body 12 by pressure from within valve body 12, a valve stem restraining member can be used. In the example of FIGS. 1-2, valve stem 30 has stem shoulder 36 facing away from body cavity 14. Valve stem shoulder 36 is defined by an enlarged diameter of valve stem 30 so that valve stem 30 has a larger diameter at stem shoulder 36 than an inner diameter of opposite facing shoulder 38 in valve body 12. Valve stem 30 can then not be ejected when valve assembly 10 is pressurized. This allows for certain testing of valve assembly 10 to be performed without the need to have the actuator attached to valve assembly 10. The retention of valve stem 30 within valve body 12 is also a safety feature as the actuator connection with valve body 12 is not a pressure containing connection. In addition, should the actuator be severely impacted, there will be no pressure released from valve assembly 10.

At an opposite end of valve stem 30 from shaped end 32 is operating end 40. Operating end 40 can be a universal interface that is engaged by an actuator to rotate valve stem 30, which in turn will rotate valve plug 26 to move valve plug 26 between the open position and the closed position and vice versa. The actuator can be, for example, hydraulic or manual. Operating end 40 can be configured so that it is possible to do factory acceptance testing on valve assembly 10 with either a hydraulic or manual type actuator. In alternate embodiments, an actuator with roller screw devices can be used. Such an actuator can replicate the orientation of the hand wheel that is sometimes used with gate valves that embodiments of this application can replace. The roller screw (or ball screw) device converts rotary motion of a hand wheel into a linear motion. The linear motion then displaces a helical slot mechanism which converts linear motion back into the needed rotary motion. The tailored canted slot can leverage the input energy into the break open and closed positions of the valve where the torques are highest. In most valve designs, the "break open" torque is as much as ten times greater than the "running" torque. Hence, by optimizing the slot geometry (such as having 15 degrees for high torque and 60 degrees for low torque, for example), the torque and number of turns to operate the valve can be significantly reduced. Alternately, a hydraulic or pneumatic piston coupled with a helical slot mechanism, a compact quarter turn fluid-based actuator, a helical spline actuator, and a rotary vane actuator can also be used. Other types of quarter turn actuators such as scotch yoke, rack and pinion, and hypoid can alternately be used as well.

At an interface between the actuator and valve assembly 10, anti-vibration lock washers can be used to prevent threaded connectors from backing off during the extreme vibrations involved in certain hydrocarbon development operations. The anti-vibration lock washers can mitigate the effects of vibration on valve assembly 10. All threaded interfaces associated with valve assembly 10 can incorporate positive anti-vibration mechanisms.

In order to guide valve plug 26 as it rotates between the open position and the closed position, and to provide stops for the valve plug 26 in both the open position and the closed position and vice versa, guide peg 42 can extend from valve body 12 and into guide slot 44. The engagement of guide peg 42 and guide slot 44 provides a hard stop of valve plug 26 to reduce or eliminate misalignment of plug through bore 28 with body bore 16. When fluid that includes solid matter flows through valve assembly 10 at high velocities, even the smallest amount of discontinuity between plug through bore 28 and body bore 16 can result in erosion of the components of valve assembly 10. By placing the hard stop directly between the valve plug 26 and valve body 12, plug through bore misalignment can be prevented.

Bearing assembly 46 can be used to accommodate axial thrust of valve stem 30 and to reduce the torque required to rotate valve stem 30. Bearing assembly 46 can be releasably secured to valve body 12 and can engage bearing shoulder 48 of valve stem 30. Bearing assembly 46 is used to transfer an axial force of valve stem 30 to valve body 12. Bearing assembly 46 can include a low friction bearing, such as roller bearings, to ease the rotation of valve stem 30. Having bearing assembly 46 together with valve stem 30 being axially unrestrained by valve plug 26 can reduce or eliminate binding of valve plug 26 and valve stem 30 within valve body 12.

Stem penetration 50 extends through valve body 12 to accommodate valve stem 30. Stem seal assembly 52 is located between valve stem 30 and valve body 12 to prevent fluids from passing between valve stem 30 and valve body 12. Stem seal assembly 52 can include primary stem seal 54 and secondary seal assembly 56. Primary stem seal 54 can be a dynamic seal that includes a member that has an inner leg in sealing engagement with valve stem 30 and an outer leg in sealing engagement with valve body 12. Primary stem seal 54 can be made of a corrosion resistant material such as alloy 625 or 718, or can be coated with a corrosion resistant material. Primary stem seal 54 can be coated with a relatively thick coating of polyether ether ketone (PEEK), polyetherketoneketone (PEKK), or other polymer of the polyaryletherketone (PAEK) family, or of a phenolic material.

Secondary seal assembly 56 can be formed of a polymer and include one or more seals that form redundant seals between valve stem 30 and valve body 12. Secondary seal assembly can include a spring energized polymeric jacket seal of Polytetrafluoroethylene (PTFE) and its derivatives. Other seals for back-up or venting can be provided in secondary seal assembly 56.

Looking at FIGS. 1-2, in order to assemble valve assembly 10, or perform maintenance on valve assembly 10, valve assembly 10 further includes valve aft opening 58. Valve aft opening 58 can be sized so that after valve stem 30 is passed through valve aft opening 58 and into stem penetration 50, sleeve 18 and valve plug 26 can be passed through valve aft opening 58 and into position within body cavity 14. Valve aft cover 60 can then be secured to valve body 12. Valve aft cover 60 can be removed to allow valve plug 26 and sleeve 18 to be replaced for maintenance, and provides for quick servicing of valve plug 26 and sleeve 18 in the field. Seal ring 62 can form a seal between an outer diameter of sleeve 18, an inner diameter of valve body 12, and valve aft cover 60. Seal ring 62 can be made of high strength steel and coated with a low friction coating such as polyamide-imides (PAI), PEEK, or other type of PAEK, with molybdenum disulfide (MoS2) or PTFE to reduce assembly forces and increase the life of seal ring 62.

Because of the large diameter of valve aft cover 60 and the need for adequate preload to energize seal ring 62, aft threads 64 are preferably a thread which reduces torque and wear on threads 64, such as, for example, a flex thread design. Valve aft cover 60 can be equipped with aft lubrication port 66. Additional lubrication and test ports 68, 70 can be used alone or in combination with aft lubrication port 66 to test and monitor pressure valve body 12 or to monitor for leaks, such as with active leakage monitoring methods.

Valve assembly 10 can include various coating and seal arrangements. As an example, sleeve 18 can have a coating and be equipped with a seal arrangement. The inner diameter of sleeve 18 can be cylindrical to maintain a balance of forces acting on valve plug 26, and to facilitate methods of manufacturing sleeve 18 known to be able to hold tight tolerances such as lathe machining, honing, and grinding. A tapered outer surface of sleeve 18 allows for tight fit to be achieved between sleeve 18 and valve body cavity 14. This tight fit can be a reliable seal with sufficient preload. The tapered geometry allows for a tight fit during assembly where valve aft cover 60 is secured to valve body 12 while driving sleeve 18 into a tight fit to valve body cavity 14. As this may be a locking taper, disassembly tooling can be used to aid in the retrieval of sleeve 18 from valve body cavity 14. Not all embodiments of the present disclosure utilize an interference type fit in order to achieve sleeve to body sealing. In alternate embodiments, sleeve 18 can have cylindrical inner and outer surfaces, or can have a varying inner diameter.

Figure 8:
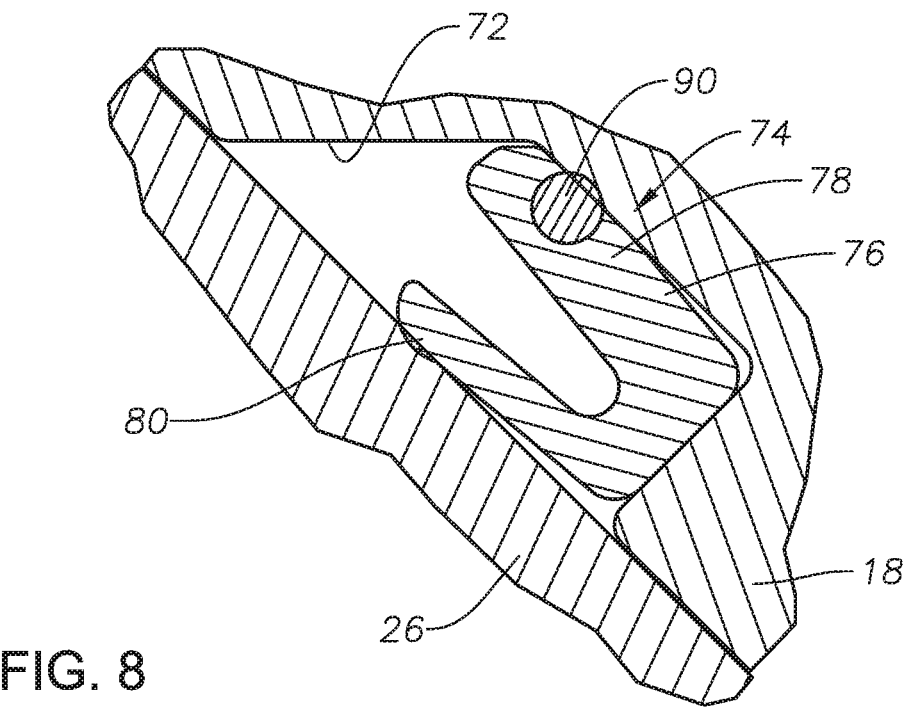
FIG. 8 is a detail section view of a seal assembly of the valve assembly of FIG. 7.
Figure 9:
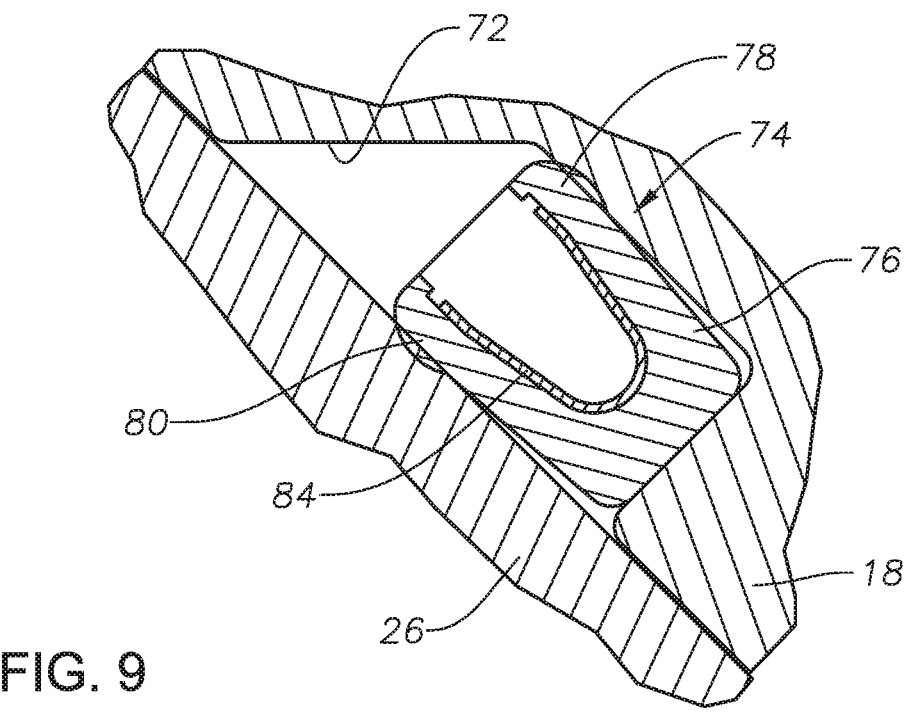
FIG. 9 is a detail section view of an alternate seal assembly of the valve assembly of FIG. 7.

Sleeve 18 can have seal groove 72 located on a sidewall surface of sleeve 18. Seal groove 72 can circumscribe one of the sleeve openings 22. Seal groove 72a can be located on the outer diameter surface of sleeve 18 and seal groove 72b can be located on the inner diameter surface of sleeve 18. Seal assembly 74 is located within seal groove 72. Looking at FIGS. 6, 8, and 9, seal assembly 74 can include seal ring 76 that is U shaped in cross section. Seal ring 76 can have an inner leg 78 that engages seal groove 72 and an outer leg 80 that extends out of seal groove 72 and engages either valve body 12 or valve plug 26. Seal ring 76 will follow the contour of seal groove 72 and therefore have a complex geometry. Seal ring can be formed with a 3-D printer in order to enable fabrication of seal ring 76. Other members of seal assembly 74 can also be printed with a 3-D printer. Seal ring 76 can be a metal member that is provided with a polymer coating to provide a softer sealing interface. Surface finish improvements can be made by various means prior to final coating if necessary. These would include vibratory polishing, chemical and vibratory polishing, electro-polishing, grit or bead blasting, or polishing by hand.

Figure 4:
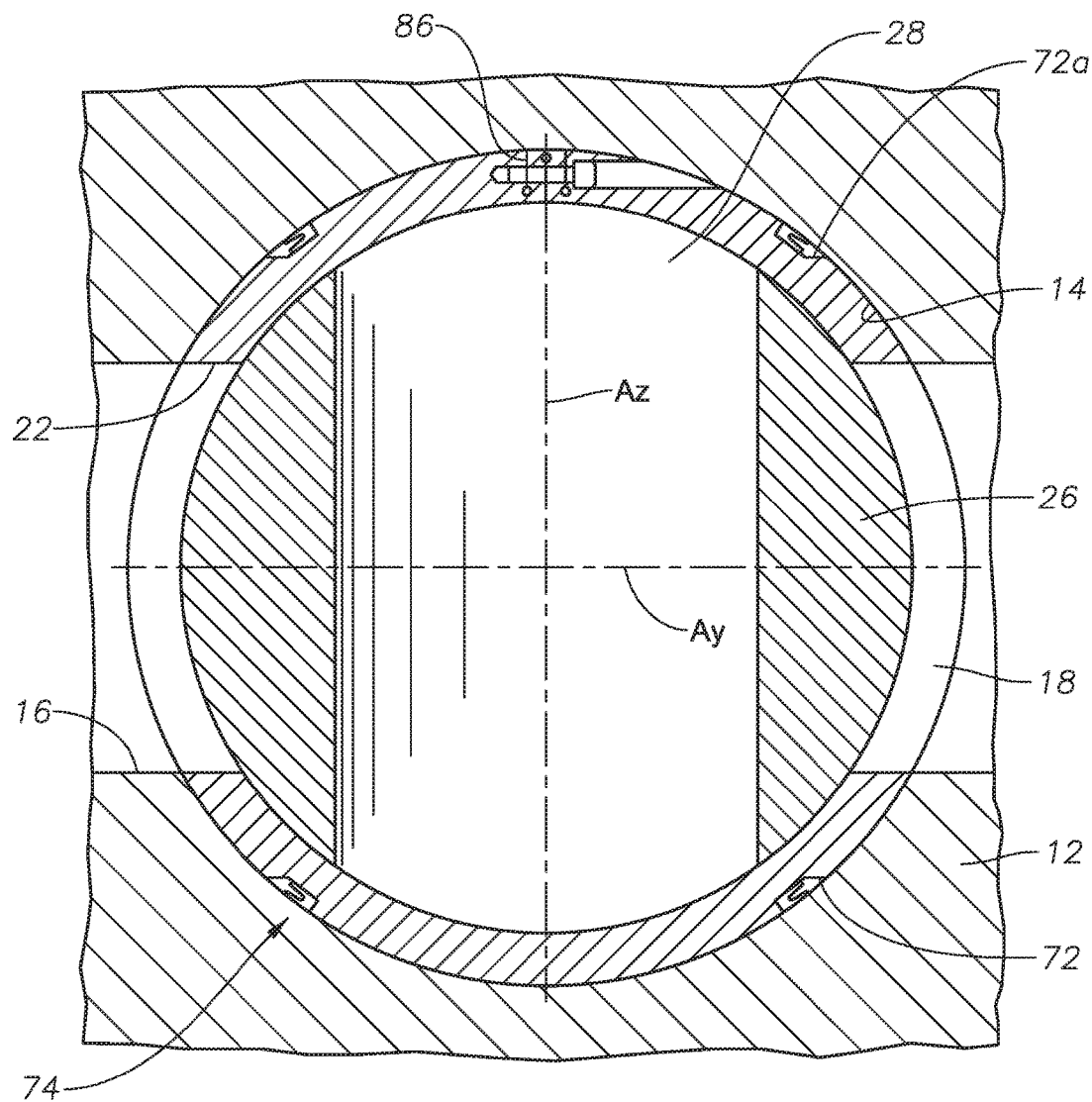
FIG. 4 is a plan section view of a valve assembly in accordance with an embodiment of this disclosure, shown with the valve plug in the closed position.
Figure 7:
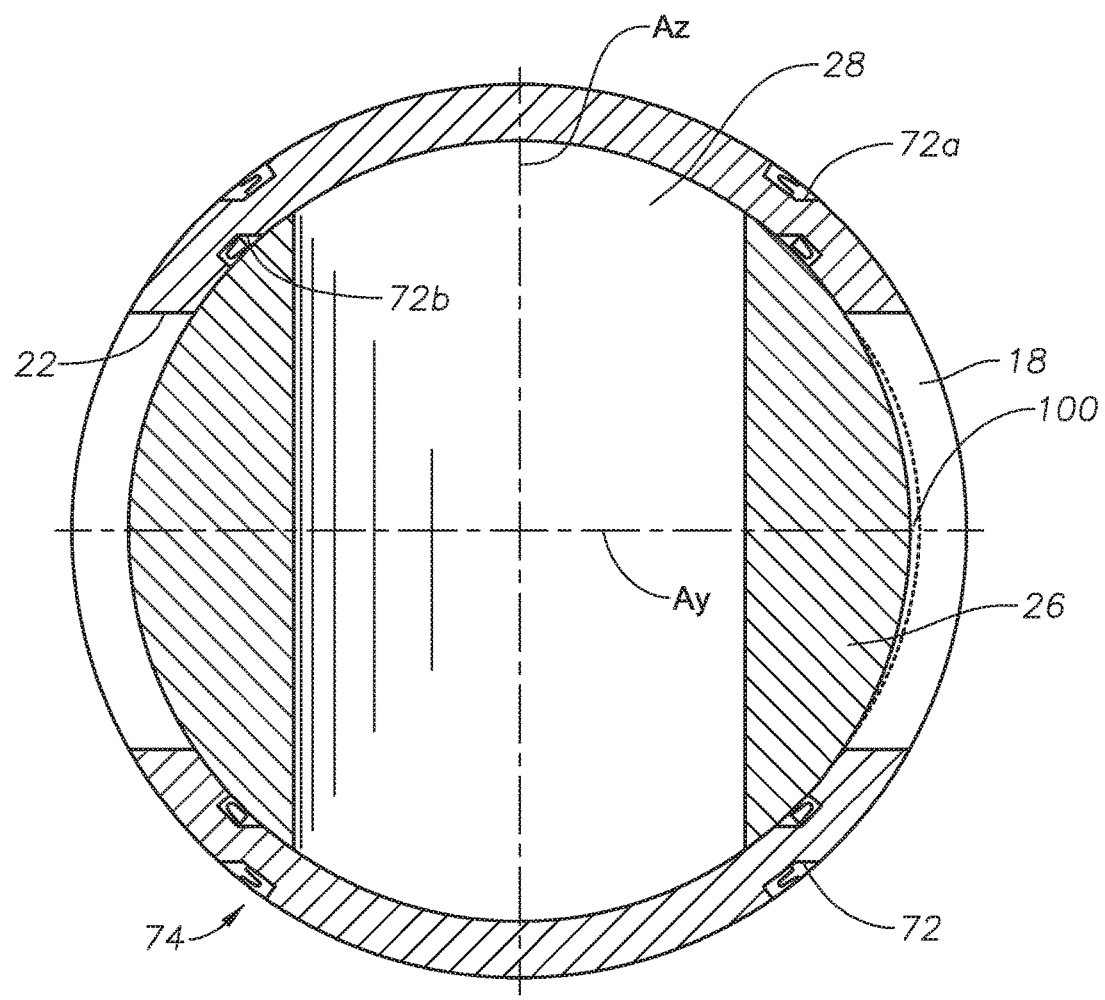
FIG. 7 is a plan section view of a valve assembly in accordance with an embodiment of this disclosure, shown with the valve plug in the closed position.

In the embodiments of FIGS. 4 and 7, seal assembly 74 is shown with legs 78, 80 pointing towards sleeve openings 22 so that fluid pressure passing through body bore 16 will tend to force legs 78, 80 apart from each other. In alternate embodiments, legs 78, 80 of seal ring 76 can point away from sleeve openings 22. In such an embodiment pressure can be allowed to seep past the upstream seal assembly 74 so as to force legs 78, 80 apart from each other to pressurize the downstream seal assembly 74.

Figure 6:
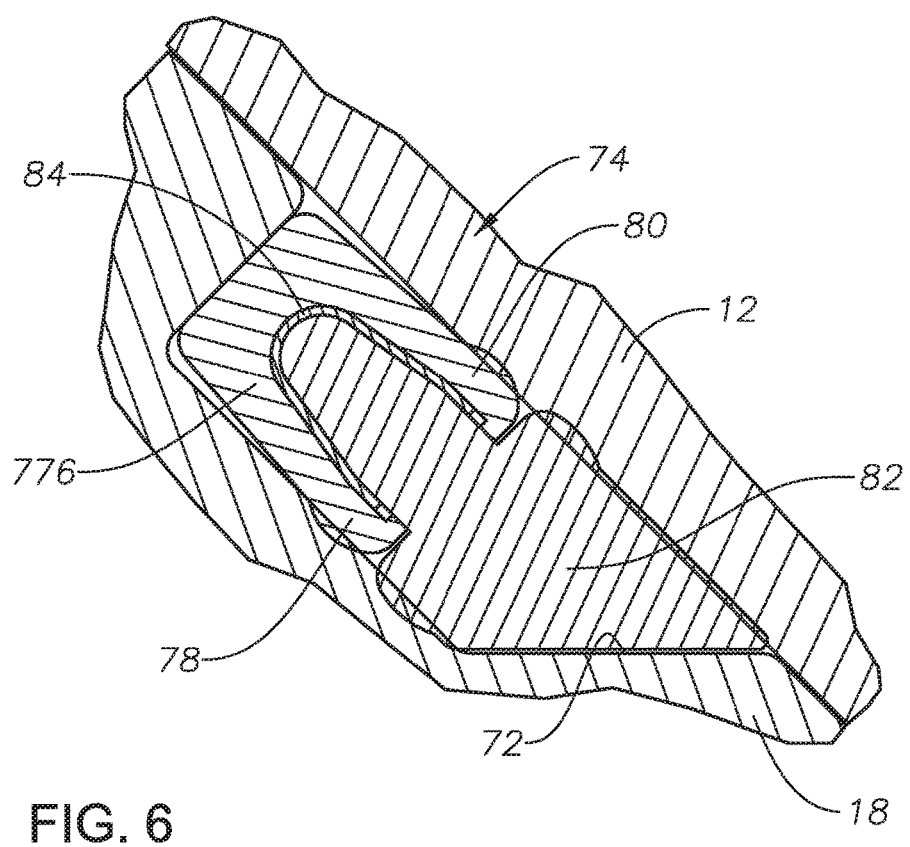
FIG. 6 is a detail section view of a seal assembly of the valve assembly of FIG. 4.

Looking at the example of FIG. 6, seal ring 76 can work with a separate seal member 82 that has an arm that is located between the legs 78, 80 of seal ring 76. Seal member 82 can form a seal between sleeve 18 and valve body cavity 14. In such an example, seal ring 76 can act not only as a sealing member, but also as an anti-extrusion ring, preventing seal member 82 from extruding past seal ring 76 when seal member 82 is under pressure. Seal ring 76 has a base that engages seal groove 72. Seal ring 76 also engages either valve body cavity 14 or valve plug 26. In the example of FIG. 6, spring member 84 can be located between the legs 78, 80 of seal ring 76 so that seal ring 76 remains in contact with seal groove 72 and with valve body cavity 14 even when there is no external pressure acting on seal ring 76. Spring member 84 can be used for an initial preload of seal ring 76 to establish a low pressure seal. Seal assembly 74 can be pressure energized at high pressures and a pressure acts on seal member 82 and will also act to further separate legs 78, 80 of seal ring 76, pushing inner leg 78 into tighter engagement with seal groove 72 and outer leg 80 into tighter engagement with valve body cavity 14. In alternate embodiments, no spring member 84 is used and legs 78, 80 have sufficient bias in a direction away from each other to form a low pressure seal.

Seal assembly 74 in the example of FIGS. 4 and 6 can allow sleeve 18 to float because of the ability of seal assembly 74 to span a gap between sleeve 18 and valve body cavity 14, and between sleeve 18 and plug 26. In certain embodiments of valve assembly 10, at an upstream side, the separation between sleeve 18 and valve body cavity 14 can be in the range of ten to fifteen thousandths of an inch. In sealing high pressure and large bore plug valves with elastomeric seal elements, current valve designs can require a zero clearance extrusion gap in order to prevent extrusion and seal failure. In embodiments of the current disclosure, seal ring 76 will prevent seal member 82 from extruding, even with a gap between sleeve 18 and valve body cavity 14, and even at high pressures, such as up to 20,000 psi. Seal ring 76 can be formed, for example, of a metal or a plastic. Seal member 82 can be formed of, for example, an elastomer that can allow seal member 82 to seal against rough or uneven surfaces. Seal member 82 can be formed of a metal and have a polymer coating.

In the example embodiment of FIG. 4, there is no seal groove 72b located on the inner diameter surface of sleeve 18. Instead, the outer diameter of valve plug 26 can seal directly with the inner diameter surface of sleeve 18. Such surfaces can be coated to improve sealing and reduce friction between valve plug 26 and sleeve 18, as further discussed herein.

In certain embodiments of valve assembly 10, at an upstream side, the separation between sleeve 18 and valve plug 26 can be in the range of one to five thousandths of an inch. Valve assembly 10 can be either upstream sealing or downstream sealing. In either way, it is always best to reduce gap clearances to minimize sand entering into the moving and sealing interface areas. In order to help avoid a gap between sleeve 18 and valve plug 26, the inner diameter sleeve 18 can be just slightly smaller than the outer diameter of valve plug 26. In certain embodiments, this can result in an interference fit between sleeve 18 and valve plug 26. This would not normally work for all-metal components but it is possible with thick and low-friction polymer coatings. Thick polymer coatings, from 3 to 100 mils, can be applied to metal parts by means of electrostatic coatings, by injection molding, or by cold spray. By preloading valve plug 26 into sleeve 18 and by using the advantage of the tapered sleeve-to-body interface, an interference fit assembly can be made easily. If sufficient interference is achieved at preload, or assembly, then the polymeric materials can expand essentially elastically when applied pressure is expanding the valve body. This approach may also be used for the interface between sleeve 18 and valve body cavity 14 as erosion of the coating is not a concern.

Figure 5:
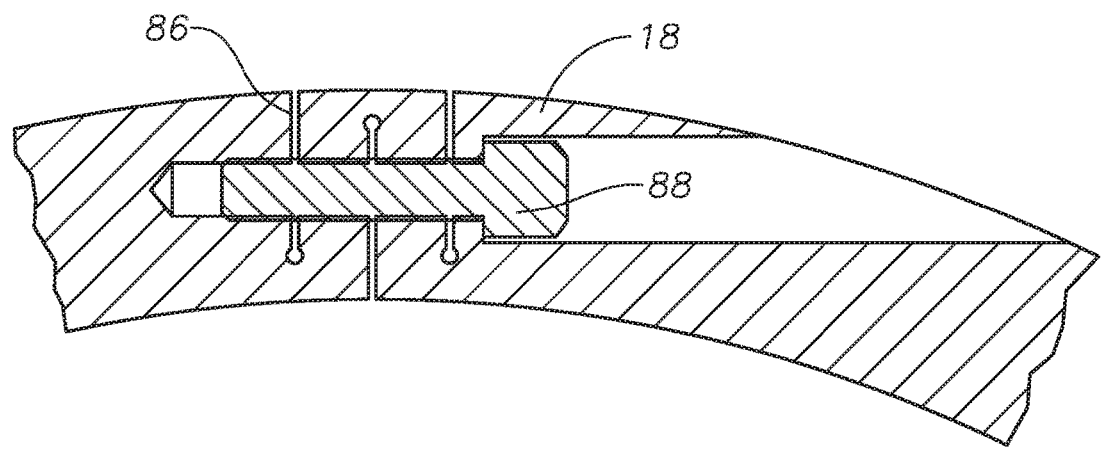
FIG. 5 is a detail section view of an expansion section of the sleeve of the valve assembly of FIG. 4.

Alternately, looking at the example of FIGS. 4-5, sleeve 18 can be a flex-sleeve where flexure in sleeve 18 is provided by one or more cuts 86. In certain embodiments, valve plug 26 can be formed with an outer diameter that is larger than the inner diameter of sleeve 18. Then when valve plug 26 is installed within sleeve 18, valve plug 26 forces sleeve 18 to expand radially outward by expanding at cuts 86. Alternately, valve plug 26 can be formed with an outer diameter that is smaller than the inner diameter of sleeve 18. Then after valve plug 26 is installed within sleeve 18, sleeve 18 can be tightened, such as with threaded member 88 as discussed below, to minimize or eliminate any gap between the inner diameter of sleeve 18 and the outer diameter of valve plug 26.

Cuts 86 extend the full height of sleeve 18 in a direction generally parallel to axis Ax. Cuts 86 extend from a surface of sleeve 18 into the sidewall of the sleeve 18. Cuts 86 can be formed, for example, by wire electrical discharge machining or by diamond wire saws. Cuts 86 will allow a portion of the diameter of sleeve 18 to increase, so that sleeve 18 expands in a hoop direction. The flexibility of sleeve 18 can be adjusted by controlling the number of cuts 86 and the spacing between cuts 86. Threaded member 88 can optionally be used to retain the integrity of sleeve 18 at the location of cuts 86. Threaded member 88 can be used to tighten cuts 86 of sleeve 18 so that the inner diameter of sleeve 18 is decreased. Threaded member 88 can alternately be used to loosen cuts 86 of sleeve 18 so that the inner diameter of sleeve 18 is increased. Threaded member 88 can also be used as a manufacturing aid. In such an embodiment, threaded member 88 can be adjusted so that the inner diameter of sleeve 18 can be used as a template for forming an outer diameter of valve plug 26 that precisely matches the inner diameter of sleeve 18.

The use of cuts 86 can eliminate any clearance gaps between valve plug 26 and sleeve 18 while allowing for the use of hard faced surfaces on both valve plug 26 and on the inner diameter surface of sleeve 18, resulting in a longer life design compared to what can be achieved with soft seals or coatings. The elimination of a gap between valve plug 26 and sleeve 18 promotes initial low pressure sealing and minimizes ingress of sand or debris between sleeve 18 and valve plug 26. In addition, the use of cuts 86 can eliminate thermal lock, which occurs when an inner valve member undergoes thermal expansion and becomes stuck within an outer valve member. Instead, with the use of cuts 86, sleeve 18 is able to expand, as needed, if valve plug 26 experiences thermal expansion.

Looking at the example embodiments of FIGS. 7-10, in alternate embodiments, seal groove 72*b* can be located on an inner diameter surface of sleeve 18. Seal assembly 74 that is located within seal groove 72 can include seal ring 76 with outer leg 78 engaging seal groove 72*b* and inner leg 80 engaging valve plug 26. In such embodiments, legs 78, 80 can be sufficiently biased away from each other to provide a low pressure seal between sleeve 18 and valve plug 26. Alternately, spring member 84 can be located between the legs 78, 80 of seal ring 76 so that seal ring 76 remains in contact with seal groove 72 and with valve plug 26 even when there is no external pressure acting on seal ring 76. Looking at FIG. 8, seal ring 76 can alternately itself act as a spring that supports O-ring 90 so that O-ring 90 maintains a sealing contact with seal groove 72.

Generally, the seal between valve plug 26 and sleeve 18 can be more subject to contact with abrasive fluids and hence is preferably made of harder materials. However, hard seal surface do not seal well, and it can therefore be advantage to coat the seal with a softer coating such as tantalum, silver, gold, indium, or with a polymer such as PEEK, PEKK, PAEK or PTFE. Seal ring 76 in the embodiment of FIG. 9 can be a spring energized polymer jacketed seal made of polysulphones, PEEK, PEKK, or equivalent PAEK polymer and composites of the same, including polybenzimidazole (PBI), with dry lubricants as needed. Spring member 84 can be formed of Elgiloy or other highly corrosion resistant material. The placement of seal groove 72*b* on an inner diameter surface of sleeve 18 can be near or away from plug through bore 28 depending on the design intent and materials used.

The constant force of legs 78, 80 acting on sleeve 18 and valve plug 26 will add torque to the operation of valve assembly 10, so the preload should be minimized and just enough to promote a low pressure seal. The drag forces between sleeve 18 and valve plug 26 can be reduced by reducing the area in contact between sleeve 18 and valve plug 26. The drag is also minimized by the use of low friction coatings between sleeve 18 and valve plug 26, such as tungsten carbide (WC) with a diamond like coating (DLC).

Sleeve 18 may be made entirely from a polymeric material. The use of high temperature polymers and their blends, can allow sleeve 18 to withstand considerable temperatures and pressures. The polymers of sleeve 18 could be made from PAEK or polysulphone type polymers with additives such as PBI or glass/carbon fillers with appropriate low friction additives such as PTFE and MoS2. In alternate embodiments, sleeve 18 can be formed of a polymer material on the outer and inner surfaces, and have a metal material on the inside. This would provide a greater amount of compressions and expansion of seals that are in contact with sleeve 18 and provide an erosion resistance coating for the surface that slides along valve plug 26, which is subject to the erosive fluids.

Figure 12:
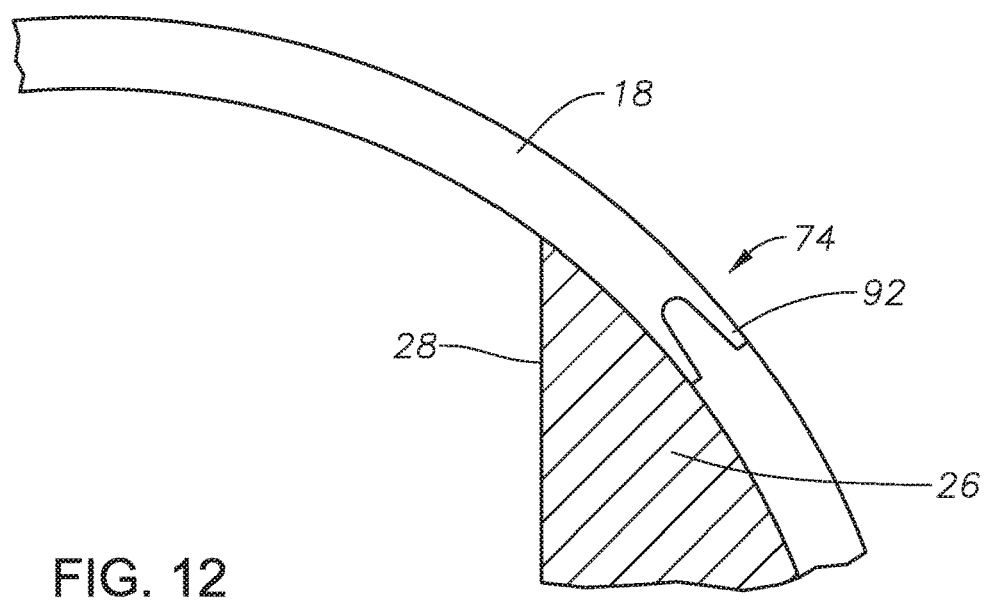
FIG. 12 is a plan section view of an alternate seal assembly of a valve assembly in accordance with an embodiment of this disclosure.
Figure 13:
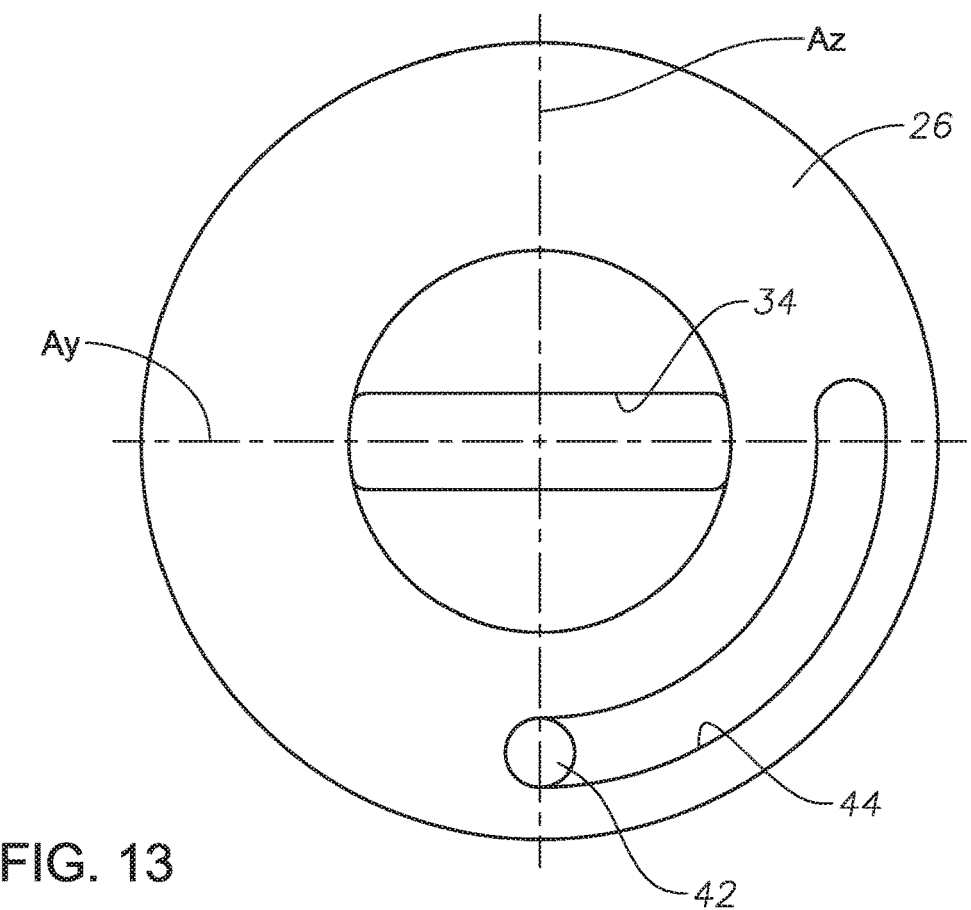
FIG. 13 is a top view of a valve plug in accordance with an embodiment of this disclosure.

In the embodiment of FIG. 12, sleeve 18 can be formed of materials that include a polymer so that seal assembly 74 includes sealing legs 92 that are integrally formed as part of sleeve 18. The outer lips of sealing legs 92 extend beyond the outer diameter and the inner diameter of sleeve 18 to increase contact pressures locally to promote sealing. If sleeve 18 is formed of metal, sleeve 18 may be selectively or entirely coated with a polymer coating for enhanced seal performance at seal assembly 74.

Figure 11:
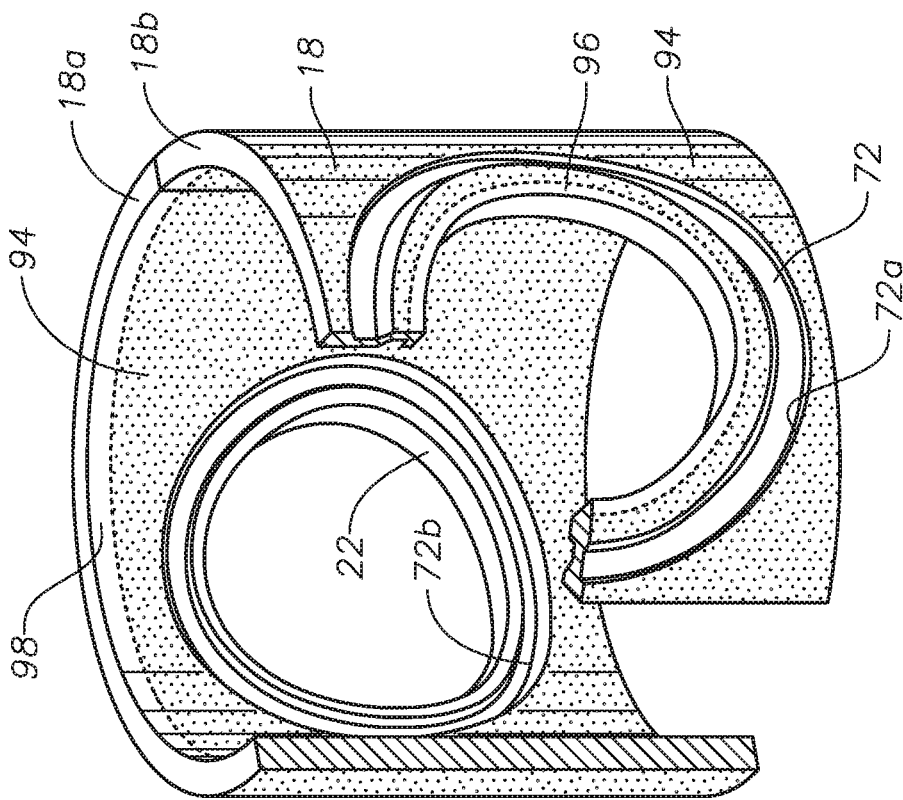
FIG. 11 is a perspective partial section view of a sleeve of a valve assembly in accordance with an embodiment of this disclosure.
Figure 10:
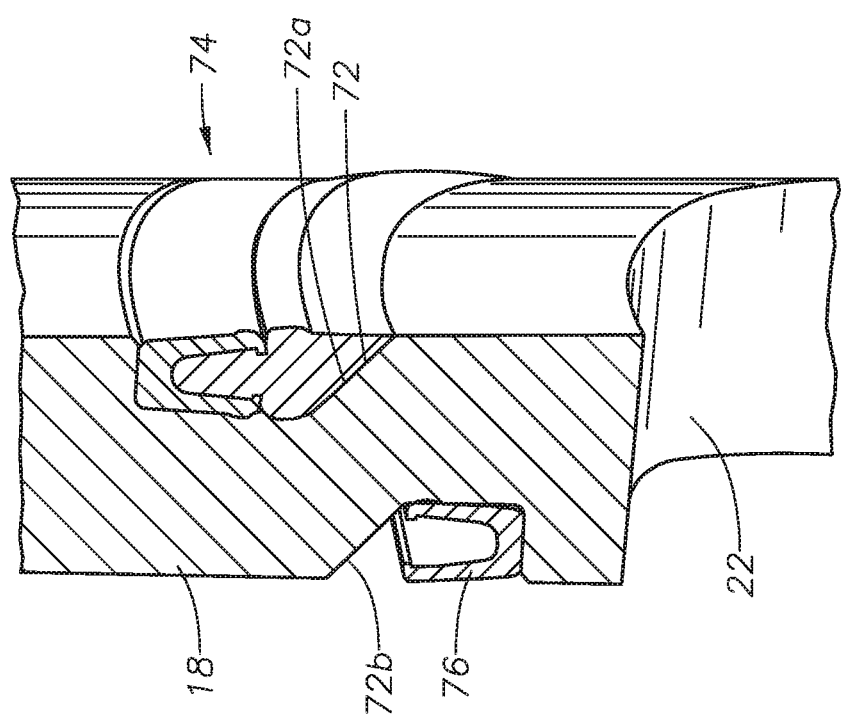
FIG. 10 is a detail perspective section view of seal assemblies of the valve assembly of FIG. 7.

In alternate embodiments, looking at FIG. 11, sleeve 18 can be a split sleeve that can include at least two sleeve portions 18a, 18b. A split sleeve will allow the upstream portion of sleeve 18 to float in the downstream direction with pressure so as to maintain a zero clearance between the upstream portion of sleeve 18 and an upstream surface of valve plug 26. This reduces the chances of debris entering between sleeve 18 and valve plug 26 that would otherwise cause sealing issues. The opposite effect occurs when the pressure is applied in the reverse direction. The sleeve portions 18a, 18b can be placed in contact with valve plug 26 by the spring action of seal assembly 74, and by the applied pressure which acts across seal assembly 74.

Looking at FIG. 7, in alternate embodiments of sleeve 18, sleeve 18 can be formed so that it is not symmetrical about axis Ax (FIG. 1). Instead, sleeve 18 can have a constant outer diameter and multiple inner diameters. In particular, offset grinding can be used to form central bore 20 so that the sleeve 18 is unsymmetrical about axis Ax and has multiple inner diameters. Offset grinding can provide a central bore 20 that has a diameter or radius of curvature at sleeve openings 22 that matches the outer diameter of valve plug 26, but can have a size along axis Ay that is greater than the outer diameter of valve plug 26. The size of central bore 20 along axis Az will match the outer diameter of valve plug 26. This will result in a small gap 100 between the inner diameter of sleeve 18 and the outer diameter of valve plug 26 at the location of one or both of the sleeve openings 22. The depiction of gap 100 of FIG. 7 has been greatly exaggerated for visualization purposes. In practice, the radial depth of wider region 100 can be on the order of thousandths of an inch. The provision of gap 100 will reduce the torque required to rotate valve plug 26, while maintaining a tight fit between valve plug 26 and sleeve 18 adjacent to downstream sleeve opening 22 to maintain the integrity of seal assemblies 74.

Coatings and surface finishes can be can be applied to valve plug 26 and sleeve 18. Erosion and abrasion resistance, chemical resistance, scratch resistance, and low friction are properties can be achieved through such coatings and surface finishes. As an example, the outer surface of valve plug 26 can have a hard erosion resistant coating such a tungsten carbide, which can be applied by thermal spray or vapor deposition. Other vapor deposited coating choices for valve plug 26 could include titanium carbide (TiC), titanium aluminium nitride (TiAlN), Titanium Nitride (TiN), DLCs, diamond, and multilayered titanium and titanium aluminium nitride (TiTiAlN) coatings. Diffusion coatings are also a viable a coating technology for this application, such as trinitrotoluene (TNT), ion nitriding, and boron nitride (BN). These coatings can also be used together to achieve the desired combination of properties.

The inner diameter surface of sleeve 18 could include a low friction coating, such as a combination of tungsten carbide and DLC, or alternately TiC, TiAlN, TiN, DLCs, diamond, multilayered TiTiAlN coatings, or a softer metal such as tantalum. Polymeric materials such as PEKK with MoS2, and various PTFE derivatives can alternately be used. The use of such coatings can reduce the dependency on grease which is a common requirement of current high pressure valve designs. Such valves must be re-lubricated in the field, sometimes after only four cycles of the valve. The use of friction-reducing coatings can reduce the torque on the valve, and the need for re-greasing is greatly diminished or even eliminated.

Coatings can be applied to inner and outer diameter surfaces of sleeve 18 to affect the stresses acting on the inner and out diameter surfaces of sleeve 18. Coatings can be applied in regions where stresses that would otherwise act on uncoated surfaces can be increased, and coatings can be absent in regions where stresses that would otherwise act on uncoated surfaces are to be decreased.

The forces acting on sleeve 18 can vary across the surfaces of sleeve 18 and valve body 12. In order to redistribute such forces more evenly across contact surface between sleeve 18 and valve body 12 and to ensure there are no surfaces that are subjected to forces above a desired threshold, the location and thickness of coating 94 can be varied. Coating 94 can vary in thickness over a coverage area, and the coverage area itself can be optimized. As an example, the forces acting on sleeve 18 can be highest adjacent to sleeve openings 22. Although regions of contact between the outer diameter of sleeve 18 and the inner diameter of valve body 12 are static, the flexibility of sleeve 18 will affect the load path between sleeve 18 and valve body 12.

Looking at FIG. 11, coating 94 on an outer surface of sleeve 18 can be located in a region of sleeve 18 between seal groove 72 and sleeve opening 22, however, an area 96 adjacent to sleeve opening 22 can free of the coating 94. This can reduce the thickness of the sidewall of sleeve 18 proximate to sleeve opening 22 so that forces acting on area 96 adjacent to sleeve opening 22 are reduced by providing increased flexibility to sleeve 18. Sleeve 18 can also have coating 94 on the inner surface of sleeve 18. Coating 94 on the inner surface of sleeve 18 can be spaced apart from sleeve opening 22 so that the region adjacent to sleeve opening 22 is free of coating 94.

Other regions of sleeve 18 that can be subjected to high forces are located proximate to then ends of sleeve 18 that are axially aligned with sleeve openings 22. As such, coating 94 can be reduced or eliminated at edges 98, relative to the thickness of the coating applied at other regions of sleeve 18.

Alternately, other steps can be taken to redistribute the stresses more evenly across the surfaces of sleeve 18. As an example, in order to reduce stresses acting on areas adjacent to sleeve opening 22, an area of sleeve 18 adjacent to sleeve opening 22 that circumscribes sleeve opening 22 can have a reduced sidewall thickness of the material that forms sleeve 18 before a coating, if any, is applied.

In order to create finished surfaces for valve assembly 10 accurate grinding and lapping technology can be used to achieve the finishes and flatness required for the interface between the elements of valve assembly 10. A surface finish on the order of 5 micro-inches Ra is desired for the internal surface of sleeve 18, and a finish of 5 micro-inches Ra is desirable for the outer surface of valve plug 26.

Therefore embodiments of this disclosure provide systems and methods for oil field applications and in particular for secondary recovery operations such as hydraulic fracturing. Embodiments of valve assembly 10 can be used for high pressure operations, such as 10,000 psi to 20,000 psi, and for extreme temperatures, such as from −50 F to up to 450 F. In addition to uses for hydraulic fracturing, embodiments of valve assembly 10 disclosed herein can be used anywhere that gate and ball valves have been traditionally used, including downstream oil and gas applications such as refineries or production flowlines.

The terms "vertical", "horizontal", "upward", "downward", "upstream", downstream", "above", and "below" and similar spatial relation terminology are used herein only for convenience because elements of the current disclosure may be installed in various relative positions.

While embodiments of the disclosure have been shown or described in only some of their forms, it should be apparent to those skilled in the art that it is not so limited, but is susceptible to various changes without departing from the scope of the disclosure.

What is claimed is:

1. A valve assembly for managing a flow of fluids in hydrocarbon drilling, production and processing operations, the valve assembly comprising:
    a valve body having an internal body cavity and a body bore extending through the valve body and intersecting the body cavity;
    a valve plug located within the body cavity, the valve plug having a plug through bore and being rotatable between an open position where the plug through bore registers with the body bore and a closed position where the valve plug prevents a flow of a fluid through the body bore;
    a sleeve located between the valve plug and the valve body, the sleeve having a central bore and a pair of sleeve openings through a sidewall of the sleeve that align with the body bore, the sleeve being rotationally fixed to the valve body so that the sleeve remains rotationally static relative to the valve body as the valve plug rotates within the sleeve between the open position and the closed position;
    a seal groove located on a sidewall surface of the sleeve, the seal groove circumscribing one of the sleeve openings; and
    a seal assembly located within the seal groove, the seal assembly having a seal ring being U shaped in cross section with an inner leg that engages the seal groove and an outer leg that extends out of the seal groove and engages one of the valve body and the valve plug, and a seal member having a tongue that is extendable into the space between the inner leg and the outer leg of the seal ring to reduce extrusion of the seal member.

2. The valve assembly according to claim 1, wherein when the valve plug is in the closed position, the valve plug is operable to block the fluid flowing in a first direction through the valve body and to block the fluid flowing in a second direction through the valve body.

3. The valve assembly according to claim 1, further including a valve stem extending from the valve plug through the valve body, the valve stem having a shaped end in engagement with a stem profile of the valve plug so that the valve stem is axially unrestrained by the valve plug.

4. The valve assembly according to claim 1, further including a valve stem extending from the valve plug through the valve body, the valve stem being a separate member from the valve plug, wherein the valve plug is operable to float within the sleeve.

5. The valve assembly according to claim 1, further including a bearing assembly, the bearing assembly circumscribing a valve stem that extends from the valve plug through the valve body, the bearing assembly being releasably secured to the valve body and engaging a shoulder of the valve stem.

6. The valve assembly according to claim 1, further including a valve stem extending from the valve plug through the valve body, the valve stem having a valve stem shoulder facing away from the body cavity defined by an enlarged diameter of the valve stem, the valve stem shoulder sized to mate with an opposite facing shoulder of the valve body.

7. The valve assembly according to claim 1, further including a coating on an outer surface of the sleeve, the coating varying in thickness over a coverage area on the outer surface of the sleeve.

8. The valve assembly according to claim 1, further including a coating on an inner surface of the sleeve, the coating varying in thickness over a coverage area on the inner surface of the sleeve.

9. The valve assembly according to claim 1, wherein an area of the sleeve adjacent to the sleeve opening that circumscribes the sleeve opening has a reduced sidewall thickness.

10. The valve assembly according to claim 1, wherein the sleeve is unsymmetrical about a central axis, the sleeve having multiple inner diameters.

11. The valve assembly according to claim 1, wherein the sleeve has multiple outer diameters.

12. The valve assembly according to claim 1, wherein the seal ring is a 3-D printed member.

13. The valve assembly according to claim 1, wherein the seal assembly includes a metallic seal in engagement with the seal ring, the metallic seal having a polymer coating.

14. The valve assembly according to claim 1, wherein the seal assembly includes an anti-extrusion ring, the anti-extrusion ring engaging the seal groove and also engaging one of the valve body and the valve plug.

15. The valve assembly according to claim 1, wherein the sleeve is expandable in a hoop direction, the sleeve having one or more axially oriented cuts extending from a surface of the sleeve into the sidewall of the sleeve.

16. The valve assembly of claim 1, wherein the inner diameter of the sleeve and the outer diameter of the valve plug have a tungsten carbide coating.

17. The valve assembly of claim 16, wherein at least one of the inner diameter of the sleeve and the outer diameter of the valve plug have a diamond like carbon coating.

18. A method of forming a valve assembly for managing a flow of fluids in hydrocarbon drilling, production and processing operations, the method comprising:
    providing a valve body having an internal body cavity and a body bore extending through the valve body and intersecting the body cavity;
    providing a sleeve having a central bore and a pair of sleeve openings through a sidewall of the sleeve;
    forming a pair of seal grooves on a sidewall surface of the sleeve, each seal groove circumscribing one of the sleeve openings;
    locating a seal assembly within the seal groove, the seal assembly having a seal ring that is U shaped in cross section, having a first leg and a second leg, and a seal member having a tongue that is extendable into the space between the first leg and the second leg of the seal ring to reduce extrusion of the seal member;
    locating a valve plug within the sleeve, the valve plug having a plug through bore; and
    rotationally fixing the sleeve within the valve body so that the pair of sleeve openings align with the body bore, and so that an inner leg of the seal ring engages the seal groove and an outer leg of the seal ring extends out of the seal groove and engages one of the valve body and the valve plug, and so that the valve plug is rotatable between an open position where the plug through bore registers with the body bore and a closed position where the valve plug prevents a flow of a fluid through the body bore, the sleeve remaining rotationally static relative to the valve body as the valve plug rotates within the sleeve between the open position and the closed position.

19. The method according to claim 18, further comprising 3-D printing the seal ring.

20. The method according to claim 18, wherein the step of rotationally fixing the sleeve within the valve body includes passing the sleeve and the valve plug through a valve aft opening and the method further comprising securing a valve aft cover to the valve body, the valve aft cover sealingly engaging the valve body.

21. The method according to claim 18, further comprising before rotationally fixing the sleeve within the valve body, extending a valve stem through the valve body, the valve stem having a shaped end for engagement with a stem profile of the valve plug is axially unrestrained by the valve plug.

22. The method according to claim 18, further comprising circumscribing a valve stem that extends through the valve body with a bearing assembly, the bearing assembly being releasably secured to the valve body and engaging a shoulder of the valve stem.

23. The method according to claim 18, further comprising coating an outer surface of the sleeve with a coating, the coating varying in thickness over a coverage area on the outer surface of the sleeve.

24. The method according to claim 18, further comprising coating an inner surface of the sleeve with a coating, the coating varying in thickness over a coverage area on the inner surface of the sleeve.

25. The method according to claim 18, further comprising providing the sleeve with an area adjacent to the sleeve opening that circumscribes the sleeve opening that has a reduced sidewall thickness.

26. The method according to claim 18, further comprising providing the sleeve that is unsymmetrical about a central axis, the sleeve having multiple inner diameters.

27. The method according to claim 18, wherein the seal assembly includes a metallic seal, the method further comprising coating the metallic seal with a polymer coating.

28. The method according to claim 18, further comprising providing an anti-extrusion ring, the anti-extrusion ring engaging the seal groove and also engaging one of the valve body and the valve plug.

29. The method according to claim 18, further comprising forming axially oriented cuts in the sleeve, the cuts extending from a surface of the sleeve into the sidewall of the sleeve, so that the sleeve is expandable in a hoop direction.

30. A method of managing a flow of fluids in hydrocarbon drilling, production and processing operations with a valve assembly, the method comprising:
  providing a valve body having an internal body cavity and a body bore extending through the valve body and intersecting the body cavity;
  providing a valve plug within the valve body, the valve plug having a plug through bore;
  rotationally fixing a sleeve in the valve body between the valve body and the valve plug, the sleeve having a central bore, a pair of sleeve openings through a sidewall of the sleeve, and a seal assembly located within each of a pair of seal grooves on a sidewall surface of the sleeve, the seal assembly having a seal ring that is U shaped in cross section, having a first leg and a second leg, and a seal member having a tongue that is extendable into the space between the first leg and the second leg of the seal ring to reduce extrusion of the seal member, each seal groove circumscribing one of the sleeve openings and, wherein the seal assembly has a seal ring that is U shaped in cross section with an inner leg of the seal ring engaging the seal groove and an outer leg of the seal ring extending out of the seal groove and forming a seal with one of the valve body and the valve plug; and
  rotating the valve plug between an open position where the plug through bore registers with the body bore and a closed position where the valve plug prevents a flow of a fluid through the body bore.

31. The method according to claim 30, further comprising blocking the fluid flowing in a first direction through the valve body with the valve plug in the closed position and then blocking the fluid flowing in a second direction through the valve body with the valve plug in the closed position.

32. The method according to claim 30, wherein the step of rotating the valve plug between the open position and the closed position includes rotating a valve stem that extends from the valve plug through the valve body, the valve stem having a shaped end in engagement with a stem profile of the valve plug so that the valve stem is axially unrestrained by the valve plug.

33. The method according to claim 30, further comprising transferring an axial force of a valve stem that extends from the valve plug through the valve body with a bearing assembly, the bearing assembly being releasably secured to the valve body and including a thrust bearing that engages a shoulder of the valve stem.

34. The method according to claim 30, further comprising providing a coating on an outer surface of the sleeve, the coating varying in thickness over a coverage area on the outer surface of the sleeve.

35. The method according to claim 30, further comprising providing a coating on an inner surface of the sleeve, the coating varying in thickness over a coverage area on the inner surface of the sleeve.

36. The method according to claim 30, further comprising providing an area of the sleeve adjacent to the sleeve opening that circumscribes the sleeve opening with a reduced sidewall thickness.

37. The method according to claim 30, further comprising providing the sleeve with unsymmetrical cross section about a central axis, the sleeve having multiple inner diameters.

38. The method according to claim 30, wherein the seal assembly includes a 3-D printed member with a polymer coating.

39. The method according to claim 30, further comprising providing an anti-extrusion ring of the seal assembly, the anti-extrusion ring engaging the seal groove and also engaging one of the valve body and the valve plug.

40. The method according to claim 30, further comprising providing one or more axially oriented cuts in the sleeve, the cuts extending from a surface of the sleeve into the sidewall of the sleeve so that the sleeve is expandable in a hoop direction.

* * * * *